(No Model.) 2 Sheets—Sheet 2.

O. C. NILSON.
HAY STACKER.

No. 500,599. Patented July 4, 1893.

Witnesses
John Shaw
D. P. Holhaupter

Inventor
Oliver C. Nilson

By his Attorneys,
C. A. Snow & Co.

UNITED STATES PATENT OFFICE.

OLIVER CURTIS NILSON, OF JOPLIN, MISSOURI.

HAY-STACKER.

SPECIFICATION forming part of Letters Patent No. 500,599, dated July 4, 1893.

Application filed February 6, 1893. Serial No. 461,180. (No model.)

*To all whom it may concern:*

Be it known that I, OLIVER C. NILSON, a citizen of the United States, residing at Joplin, in the county of Jasper and State of Missouri, have invented a new and useful Hay-Stacker, of which the following is a specification.

This invention relates to hay stackers or rickers; and it has for its object to provide certain improvements in machines of this character so as to provide efficient means for piling up hay in a straight round stack or in rick.

To this end the main and primary object of the invention is to provide certain improvements in stackers, which can be moved from place to place, and which are designed to evenly feed or distribute the pitched hay onto the stack or rick, so as to pile the same up straight and thus avoid uneven stacks or ricks, which are liable to topple over, and which when partly used from are unduly exposed to the weather.

With these and other objects in view which will readily appear as the nature of the invention is better understood, the same consists in the novel construction, combination and arrangement of parts, hereinafter more fully described, illustrated and claimed.

Figure 1:
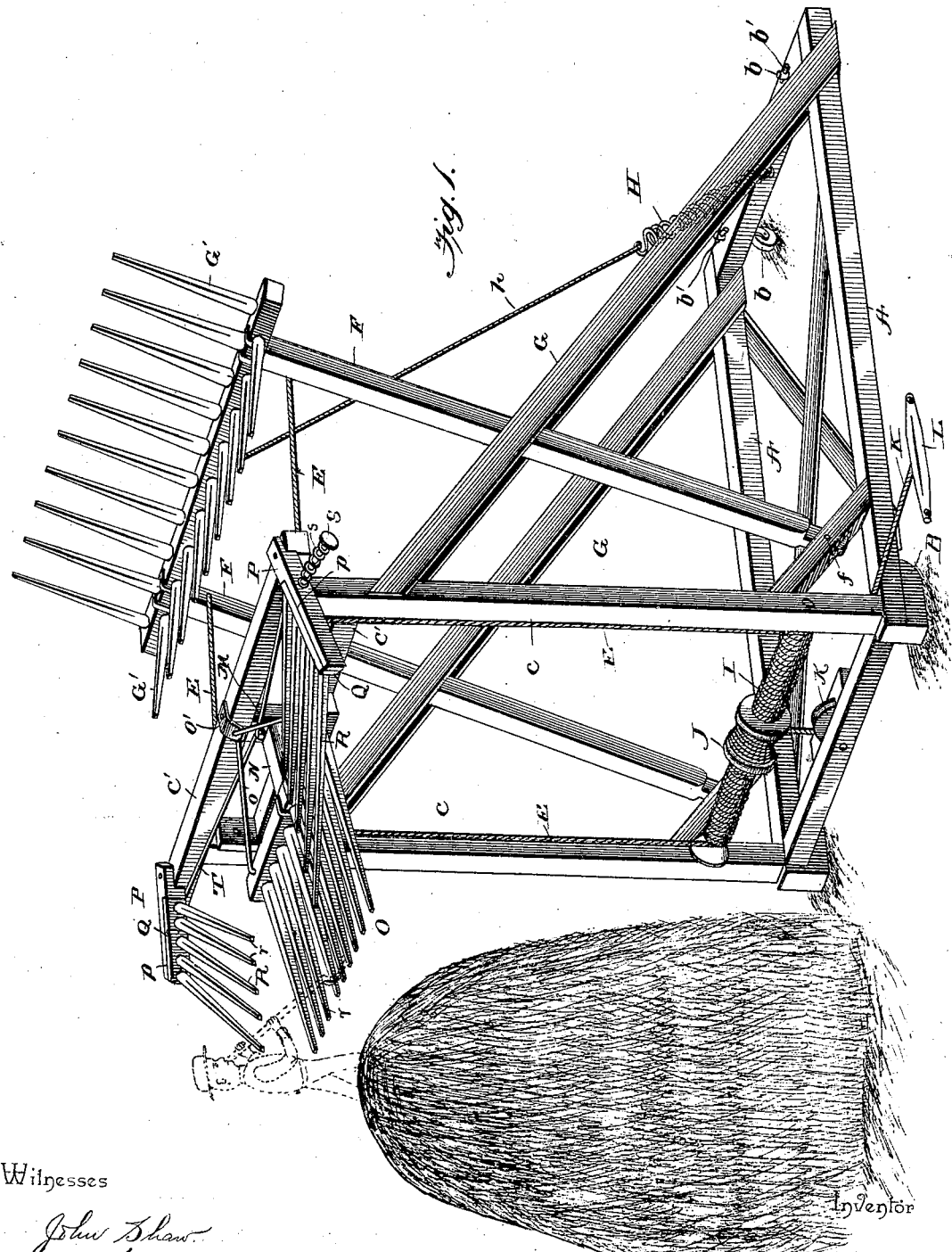
Figure 2:
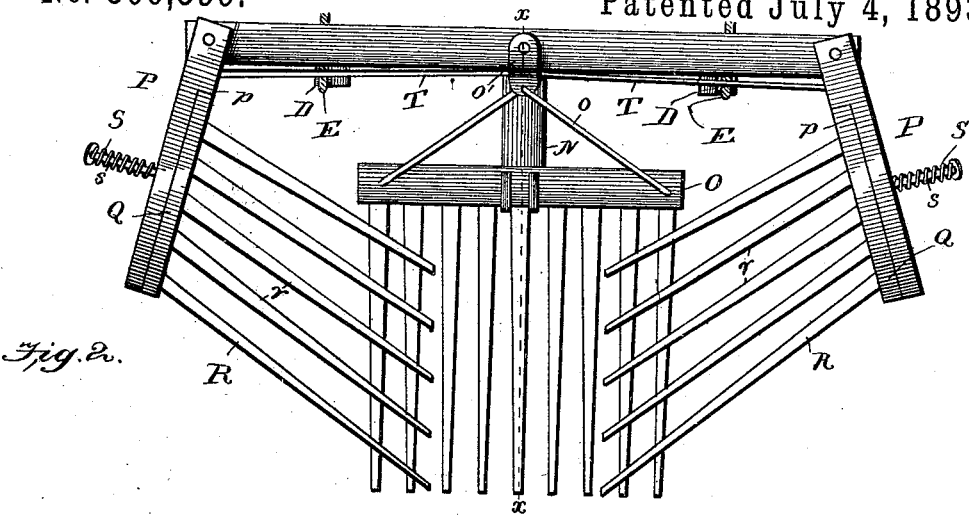
Figure 3:
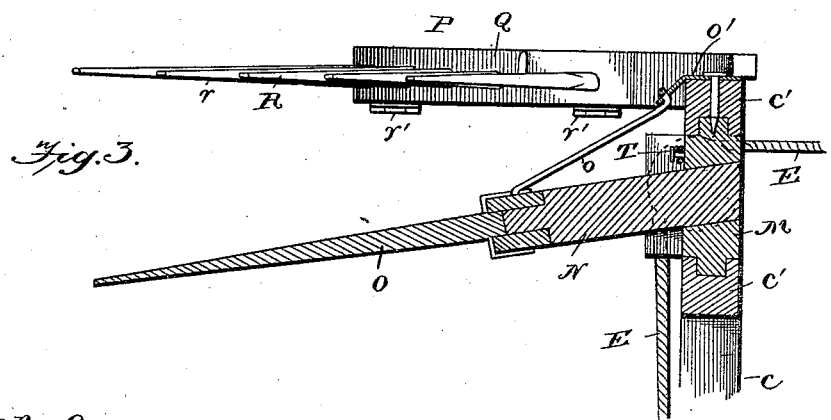
Figure 4:
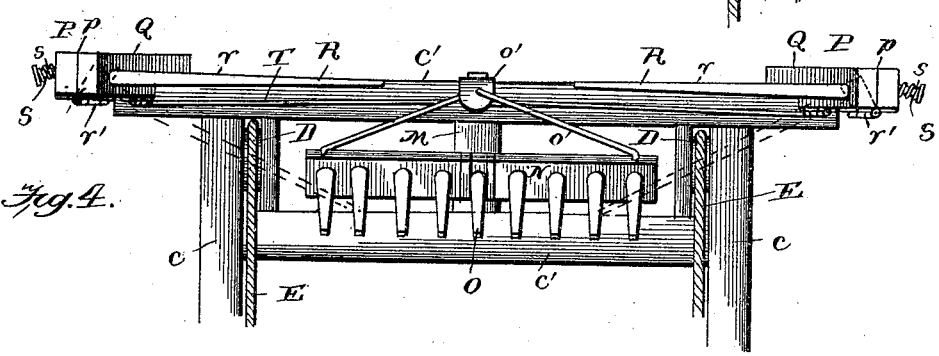
Figure 5:
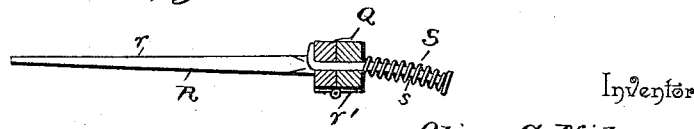

In the accompanying drawings:—Figure 1 is a perspective view of a hay stacker or ricker constructed in accordance with my invention and in operative position. Fig. 2 is a top plan view of the stack feeding or distributing end of the stacker. Fig. 3 is a detail vertical sectional view on the line $x$—$x$ of Fig. 2. Fig. 4 is an end view of the stacker showing both positions of the side distributing forks. Fig. 5 is a detail sectional view of one of the side distributing forks and the arm to which it is attached.

Referring to the accompanying drawings, A represents a rectangular stacker base frame having at one end the runner blocks B, and at the other end thereof the removable casters $b$, which are removably held in position by means of the keys $b'$.

The caster wheels, together with the runner blocks, provide means whereby the stacker can be transported from place to place, and when the stacker is placed in the position where it is desired to form the stack or rick, the wheels are removed so as to prevent the machine from slipping.

Arising from one end of the base frame A, is the end derrick frame C, comprising the opposite vertical uprights $c$, connected at their upper ends by the parallel cross-pieces $c'$, between which, alongside of the upper ends of each of the uprights $c$, are arranged the opposite guide pulleys D, over which pass the elevating ropes E, connected at one end to the swinging ends of the pitching fork arms F.

The pitching fork arms F, are pivoted at their inner ends at $f$, to the derrick end of the stacker, and move between the opposite pairs of guide strips G, connected to the uprights $c$ and to said base frame. The said swinging fork arms F, carry at their outer ends the pitching fork G', which is designed to elevate the hay from the wagon or ground, and pitch it over the upper end of the derrick onto the stack feeding or hay distributing devices to be presently described. After the pitching fork has been carried up to the upper end of the derrick frame, the same is automatically returned to its lowered position by means of the retractile spring H, connected at one end to one end of the base frame and at its other end to the cord $h$, attached to the pitching fork.

A winding windlass I, is journaled between the derrick uprights $c$, near their lower ends and accommodates upon opposite ends thereof the elevating ropes E, so that as the windlass is turned in one direction the said ropes elevate the pitching fork. The said windlass is provided with a central raised drum J, on which winds and unwinds the operating rope K. The operating rope K, passes from the drum over a lower guide pulley $k$, and has attached thereto a single or double tree, L, to which the draft animal or animals are attached in order to operate the swinging pitching fork.

Pivoted centrally between the upper cross pieces $c'$, of the derrick frame, is the pivot block M, to which is attached the downwardly inclined fork arm N. The fork arm N, carries upon its outer end the central main distributing or feeding fork O, which, owing to the disposition of its fork arm, is also inclined at an angle downwardly, so that the hay which is thrown thereon from the pitching fork will slide evenly onto the stack, of course assisted, when the stack is sufficiently high, by the person on the stack, as shown in Fig. 1 of the drawings. The main distributing or feeding fork, O, is held braced in its downwardly inclined position by means of the brace wire o, connected to opposite ends of the tined head and to the pivoted plate o', attached to the top of the derrick frame.

Pivoted to opposite ends of the upper cross-piece of the derrick frame are the opposite swinging side fork arms P. The opposite side swinging fork arms P, are recessed at one side as at p, to accommodate the tine heads Q, of the opposite side dropping forks R. The tines r, of the forks are set at an angle in the tine heads, and disposed toward the outer extremity of the central feeding or distributing fork between the same. The tine heads of the opposite side distributing forks are hinged at their lower edges to the side fork arms P, on the hinges r', and are normally held in the recesses p, of said fork arms, by means of the springs S. The springs S, are arranged over the headed ends of the curved bolts s, passing through the arms P, and loosely connected to the tine heads Q. By means of the springs S, the opposite side distributing forks are normally held in a horizontal position, so that when the pitching fork throws the hay onto the same, they drop under the weight of the hay and allow the same to be directed onto the main central feeding or distributing fork, O, again returning to their horizontal positions after being relieved of the load. The said swinging side fork arms P, are connected together by the transverse connecting rod T. The said transverse connecting rod T, is loosely connected at its end to the rods P, and also connected centrally to the pivot block M, so that the main central distributing or feeding fork together with the opposite side forks can be simultaneously adjusted by the person on the stack, by simply moving the central fork in either direction.

When the machine is used for piling up a straight round stack, the main distributing fork is in a line with the throw or pitch of the pitching fork, and in this position, combined with the dropping side forks, evenly distributes and feeds the hay to the stack. When it is desired to stack the hay in rick, the forks are moved in either direction at an angle to the throw of the pitching fork, so that the hay can be distributed over a greater area of stack.

It is thought that the operation and many advantages of the herein described stacker, and particularly of the feeding and distributing devices thereof will now be apparent, and I will have it understood that changes in the form, proportion and the minor details of construction may be resorted to without departing from the principle or sacrificing any of the advantages of this invention.

Having thus described my invention, what I claim, and desire to secure by Letters Patent, is—

1. In a hay stacker, the combination with a derrick frame and a swinging pitching fork adapted to pitch thereover, of adjustable distributing devices arranged at the upper end and at one side of said derrick frame, substantially as set forth.

2. In a hay stacker, the combination with a derrick frame and a swinging pitching fork; of laterally movable distributing devices arranged at the upper end and at one side of the derrick frame, substantially as set forth.

3. In a hay stacker, the combination with a derrick frame and a swinging pitching fork adapted to pitch over said derrick frame; of a distributing fork pivotally connected to the upper end of said derrick frame, substantially as set forth.

4. In a hay stacker, the combination with the derrick frame and the swinging pitching fork; of a laterally movable distributing fork pivoted centrally to the upper end of said derrick frame and downwardly inclined, substantially as set forth.

5. In a hay stacker, the combination with a derrick frame and a swinging pitching fork working adjacent thereto; of a central distributing fork connected centrally to the upper end of the derrick frame and downwardly inclined, and opposite dropping side forks connected to opposite upper ends of the derrick frame, substantially as set forth.

6. In a hay stacker, the combination with the derrick frame and the adjacent pitching fork adapted to pitch thereover; of a central downwardly inclined distributing fork pivotally connected at its inner ends to the upper end of said derrick frame, and opposite dropping spring-returned side forks pivotally connected to opposite upper ends of the derrick-frame, to each other, and said central distributing fork, substantially as set forth.

7. In a hay stacker, the combination of the derrick frame, the swinging pitching fork adapted to pitch thereover, a laterally movable distributing fork downwardly inclined and centrally pivoted at its inner end to the upper end of said derrick frame, opposite swinging fork arms pivoted to opposite upper ends of said derrick frame, dropping side distributing forks hinged to said side swinging fork arms and having their tines disposed at an angle toward the outer extremity of the central distributing fork, spring devices attached to said side fork arms and said side distributing forks to normally hold the latter in a horizontal position above the central distributing fork, and a connecting rod loosely connected at its ends to said swinging fork arms, and to the central fork, substantially as set forth.

8. In a hay stacker the combination with a derrick frame and the swinging pitching fork adjacent thereto; of a central distributing fork pivoted centrally to the upper end of the derrick frame, opposite laterally movable fork arms pivoted to opposite upper ends of the derrick frame and recessed at one side, dropping side forks hinged at their heads to said fork arms and registering with the recesses thereof, bolts loosely connected to the heads of said side forks and passing through the fork arms, springs arranged over said bolts to normally hold the side forks above the central fork, and a single connecting rod loosely connected to said fork arms and said fork, substantially as set forth.

In testimony that I claim the foregoing as my own I have hereto affixed my signature in the presence of two witnesses.

OLIVER CURTIS NILSON.

Witnesses:
D. F. SORTWELL,
JOHN NILSON.